United States Patent
Baden et al.

(10) Patent No.: US 7,787,471 B2
(45) Date of Patent: Aug. 31, 2010

(54) FIELD PROCESSOR FOR A NETWORK DEVICE

(75) Inventors: Eric A. Baden, Saratoga, CA (US);
Mohan Kalkunte, Sunnyvale, CA (US);
John J. Dull, Sunnyvale, CA (US);
Venkateshwar Buduma, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 814 days.

(21) Appl. No.: 10/985,033

(22) Filed: Nov. 10, 2004

(65) Prior Publication Data

US 2005/0135399 A1    Jun. 23, 2005

Related U.S. Application Data

(60) Provisional application No. 60/518,289, filed on Nov. 10, 2003, provisional application No. 60/553,973, filed on Mar. 18, 2004.

(51) Int. Cl.
*H04L 12/54* (2006.01)

(52) U.S. Cl. ............ 370/395.3; 370/428; 711/108

(58) Field of Classification Search ............ 370/389, 370/392
See application file for complete search history.

(56) References Cited

U.S. PATENT DOCUMENTS

| | | | |
|---|---|---|---|
| 5,473,607 A | 12/1995 | Hausman et al. | |
| 5,761,424 A | 6/1998 | Adams et al. | |
| 5,878,043 A | 3/1999 | Casey | |
| 5,951,651 A | 9/1999 | Lakshman et al. | |
| 6,011,795 A | 1/2000 | Varghese et al. | |
| 6,041,053 A | 3/2000 | Douceur et al. | |
| 6,154,775 A | 11/2000 | Coss et al. | |
| 6,173,384 B1 | 1/2001 | Weaver et al. | |
| 6,259,699 B1 | 7/2001 | Opalka et al. | |
| 6,289,013 B1 | 9/2001 | Lakshman et al. | |
| 6,335,935 B2 | 1/2002 | Kadambi et al. | |
| 6,341,130 B1 | 1/2002 | Lakshman et al. | |
| 6,591,299 B2 | 7/2003 | Riddle et al. | |
| 6,651,099 B1 * | 11/2003 | Dietz et al. | 709/224 |
| 6,807,179 B1 | 10/2004 | Kanuri et al. | |
| 6,904,057 B2 | 6/2005 | Sarkinen et al. | |
| 7,002,965 B1 * | 2/2006 | Cheriton | 370/395.32 |
| 7,167,443 B1 * | 1/2007 | Dantu et al. | 370/218 |

(Continued)

FOREIGN PATENT DOCUMENTS

WO    WO 99/00944    1/1999

OTHER PUBLICATIONS

Non Final Office Action Received for U.S. Appl. No. 11/165,495 mailed on Dec. 1, 2008, 20 pages.

(Continued)

*Primary Examiner*—Chirag G Shah
*Assistant Examiner*—Salvador E Rivas

(57) ABSTRACT

A method of handling a datagram in a network device is disclosed. The steps include receiving a datagram, with the datagram having multiple field values, at a port of a network device, parsing the received datagram to obtain the field values, applying the parsed field values to a Ternary Content Addressable Memory (TCAM), determining matches between the parsed field values and predetermined criteria in the TCAM, indexing into a policy table based on the determined matches to obtain an action entry and taking an action based on the obtained action entry.

30 Claims, 6 Drawing Sheets

U.S. PATENT DOCUMENTS

| | | | |
|---|---|---|---|
| 7,170,893 | B2 | 1/2007 | Rajan et al. |
| 7,187,694 | B1 | 3/2007 | Liao |
| 7,200,144 | B2 | 4/2007 | Terrell et al. |
| 7,233,597 | B2 | 6/2007 | Kumar et al. |
| 7,406,088 | B2 | 7/2008 | Magd et al. |
| 7,464,181 | B2 | 12/2008 | Corl, Jr. et al. |
| 7,606,263 | B1 | 10/2009 | Parker |
| 2003/0076830 | A1* | 4/2003 | Asano ................. 370/392 |
| 2004/0062267 | A1 | 4/2004 | Minami et al. |
| 2004/0100950 | A1* | 5/2004 | Basu et al. ............ 370/389 |
| 2005/0105912 | A1 | 5/2005 | Laufer |
| 2005/0135399 | A1 | 6/2005 | Baden et al. |
| 2006/0187919 | A1 | 8/2006 | Lee et al. |
| 2007/0115966 | A1 | 5/2007 | Tzeng |
| 2008/0049774 | A1 | 2/2008 | Swenson et al. |

OTHER PUBLICATIONS

Non Final Office Action Received for U.S. Appl. No. 11/165,495 mailed on Jun. 19, 2008, 23 pages.

Final Office Action Received for U.S. Appl. No. 11/444,373 mailed on Sep. 11, 2009.

Non Final Office Action Received for U.S. Appl. No. 11/165,495 mailed on Aug. 5, 2009.

Non Final Office Action Received for U.S. Appl. No. 11/444,373 mailed on May 8, 2009.

Non Final Office Action Received for U.S. Appl. No. 11/165,495 mailed on Mar. 5, 2010, 35 pages.

Non Final Office Action Received for U.S. Appl. No. 11/444,373 mailed on Feb. 1, 2010, 12 pages.

* cited by examiner

| BUCKET_A | BUCKET_B | MPM[2:0] | STATE | DEC_A | DEC_B | COMMENT |
|---|---|---|---|---|---|---|
| Out | Out | 010 | R | NO | NO | trTCM COLOR BLIND |
| Out | In | 010 | Y | NO | YES | trTCM COLOR BLIND |
| In | Out | 010 | R | NO | NO | trTCM COLOR BLIND |
| In | In | 010 | G | YES | YES | trTCM COLOR BLIND |

Fig. 5

| BUCKET_A | BUCKET_B | MPM[2:0] | STATE | DEC_A | DEC_B | COMMENT |
|---|---|---|---|---|---|---|
| Out | Out | 000 | R | NO | NO | FLOW |
| Out | In | 000 | R | NO | NO | FLOW |
| In | Out | 000 | R | NO | NO | FLOW |
| In | In | 000 | G | YES | YES | FLOW |

Fig. 6

| PKT COLOR | BUCKET_A | BUCKET_B | MPM[2:0] | STATE | DEC_A | DEC_B | COMMENT |
|---|---|---|---|---|---|---|---|
| G | Out | Out | 011 | R | NO | NO | trTCM COLOR AWARE |
| G | Out | In | 011 | Y | NO | YES | trTCM COLOR AWARE |
| G | In | Out | 011 | R | NO | NO | trTCM COLOR AWARE |
| G | In | In | 011 | G | YES | YES | trTCM COLOR AWARE |
| Y | Out | Out | 011 | R | NO | NO | trTCM COLOR AWARE |
| Y | Out | In | 011 | Y | NO | YES | trTCM COLOR AWARE |
| Y | In | Out | 011 | R | NO | NO | trTCM COLOR AWARE |
| Y | In | In | 011 | Y | NO | YES | trTCM COLOR AWARE |
| R | Out | Out | 011 | R | NO | NO | trTCM COLOR AWARE |
| R | Out | In | 011 | Y | NO | YES | trTCM COLOR AWARE |
| R | In | Out | 011 | R | NO | NO | trTCM COLOR AWARE |
| R | In | In | 011 | G | YES | YES | trTCM COLOR AWARE |

Fig. 7

| CBS BUCKET_A | EBS BUCKET_B | MPM[2:0] | STATE | DEC_A | DEC_B | COMMENT |
|---|---|---|---|---|---|---|
| Out | Out | 110 | R | NO | NO | srTCM COLOR BLIND |
| Out | In | 110 | Y | NO | YES | srTCM COLOR BLIND |
| In | Out | 110 | G | YES | NO | srTCM COLOR BLIND |
| In | In | 110 | G | YES | NO | srTCM COLOR BLIND |

Fig. 8

| PKT COLOR | CBS BUCKET_A | EBS BUCKET_B | MPM[2:0] | STATE | DEC_A | DEC_B | COMMENT |
|---|---|---|---|---|---|---|---|
| G | Out | Out | 111 | R | NO | NO | srTCM COLOR AWARE |
| G | Out | In | 111 | Y | NO | YES | srTCM COLOR AWARE |
| G | In | Out | 111 | G | YES | NO | srTCM COLOR AWARE |
| G | In | In | 111 | G | YES | NO | srTCM COLOR AWARE |
| Y | Out | Out | 111 | R | NO | NO | srTCM COLOR AWARE |
| Y | Out | In | 111 | Y | NO | YES | srTCM COLOR AWARE |
| Y | In | Out | 111 | R | NO | NO | srTCM COLOR AWARE |
| Y | In | In | 111 | Y | NO | YES | srTCM COLOR AWARE |
| R | Out | Out | 111 | R | NO | NO | srTCM COLOR AWARE |
| R | Out | In | 111 | R | NO | NO | srTCM COLOR AWARE |
| R | In | Out | 111 | R | NO | NO | srTCM COLOR AWARE |
| R | In | In | 111 | R | NO | NO | srTCM COLOR AWARE |

FIELD PROCESSOR FOR A NETWORK DEVICE

REFERENCE TO RELATED APPLICATIONS

This application claims priority of U.S. Provisional Patent Application Ser. No. 60/518,289, filed on Nov. 10, 2003, and U.S. Provisional Patent Application Ser. No. 60/553,973, filed on Mar. 18, 2004. The subject matter of this earlier filed application is hereby incorporated by reference.

BACKGROUND OF THE INVENTION

1. Field of the Invention

The present invention relates to devices, software applications and networks that utilize data that is sent or received over data communication or computer networks. In particular, the present invention is directed to methods and apparatuses for handling datagrams received by a network device. The processor and methods described provide the ability to examine fields of datagrams that allow for greater flexibility of handling.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and, switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which MAC (media access controller) addresses exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In some network devices, there is the ability to have enhanced evaluation of packet data that arrives at the network device. One such type of enhanced evaluation may be through a fast filtering processor (FFP) or equivalent technology. In general, the technology applies masks to section of a packet and then compares the result with a predefined pattern. If the resulting pattern is a match or sometimes close to a match, then are particular handling decision is made for the packet. For example, the FFP may be used to apply a mask all of the bits of a section of a packet header save those that provide the destination address. The destination address can then be compared to a predetermined value and actions taken based on whether a match is obtained, such as, for example, dropping all packets destined for a certain address or sending the packet to a central processing unit for a certain address. Thus, this kind of enhanced handling can allow for greater capabilities of the network device to handle packet data.

However, many of these enhanced handling modules, such as a FFP, can be difficult to scale to higher bandwidths, and does not classify/filter across ports. Neither Masks nor Meters, that can be a part of the filtering, can usually be shared across ports. Additionally, there are aspects of the current FFP that are not flexible enough and other aspects that are for the most part overly general. These issues primarily have to do with the selection of bits with which to filter. Some applications might require filtering on bits and/or fields that are even further in the packet than the a set limit that most system have. In many filtering systems, this limit may be 80 Bytes. In opposite, many applications—such as the Access Control List (ACL) application—in general only need to filter on a few (for example, 5) specific fields from within the packet and do not require such an extensive bit selection mechanism. Finally, the searching mechanism of the FFP and similar filtering systems does not scale, and will not hold up under the increased bandwidth requirements of future devices with multiple 10 GE ports.

As such, there is a need in the prior art to have a filtering system that has a scalable design with support for at least 2 k Flows, that is a flexible but easy to use classification engine that would allow user for classification based on L2, L3, L4 or other User Defined Fields in the Packet, that would provide flow based metering to restrict either Individual flows or Subnets and provides a single unified design for the device.

SUMMARY OF THE INVENTION

According to one embodiment of the invention, a method of handling a datagram in a network device is disclosed. The steps include receiving a datagram, with the datagram having multiple field values, at a port of a network device, parsing the received datagram to obtain the field values, applying the parsed field values to a Ternary Content Addressable Memory (TCAM), determining matches between the parsed field values and predetermined criteria in the TCAM, indexing into a policy table based on the determined matches to obtain an action entry and taking an action based on the obtained action entry.

Additionally, the action to be taken may be at least one of dropping the datagram, replacing field values in the datagram, redirecting the datagram and copying the datagram to a central processing unit. Also, the step of determining matches may include prioritizing matches obtained from the parsed field values and the predetermined criteria based on addresses of those matches in the TCAM to obtain a prioritized match.

As well, the step of indexing into the policy table may include indexing into the policy table using the prioritized match as an index. In addition, the step of parsing the received datagram to obtain the field values may include parsing the received datagram to obtain user defined field values.

In addition, the step of applying the parsed field values to the TCAM may include applying multiple sets of parsed field values to multiple TCAMs to obtain multiple matches. Also, the method may further include obtaining multiple action values based on the multiple matches and resolving a single action based on the multiple action values. The method may also include metering a flow of datagrams through the network device through metering logic and counting a number of datagrams passing through the network device through metering logic. Additionally, the applying, determining and indexing steps may be performed by a field processor module of the network device.

According to another embodiment, a network device for handling datagrams is disclosed. The device includes receiving means for receiving a datagram, with the datagram having multiple field values, at a port of a network device, parsing means for parsing the received datagram to obtain the field values, applying means for applying the parsed field values to a Ternary Content Addressable Memory (TCAM), determining means for determining matches between the parsed field values and predetermined criteria in the TCAM, indexing means for indexing into a policy table based on the determined matches to obtain an action entry and action means for taking an action based on the obtained action entry.

According to another embodiment, a network device for handling datagrams is disclosed. The device includes at least one port interface having at least one port configured to send and receive datagrams, wherein each datagram of the datagrams have multiple field values, a pre-parser configured to parsing the received datagrams to obtain the field value and a field processor. The field processor includes at least one Ternary Content Addressable Memory (TCAM), the at least one TCAM configured to receive and process obtained field values and configured to provide an index value based on comparisons of the parsed field values and predetermined criteria, at least one policy table, having a plurality of action entries, configured to provide one of those action entries based on the index value received from the at least one TCAM and an action resolution module, configured to define an action based on the one of the action entries received from the at least one policy table. The pre-parser provides the obtained field values to the field processor and the network device takes an action on a particular datagram based the defined action for the particular datagram.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures:

FIG. 5 provides a table illustrating the metering process, according to one embodiment of the present invention;

FIG. 6 provides another table illustrating the metering process, according to one embodiment of the present invention;

FIG. 7 provides another table illustrating the metering process, according to one embodiment of the present invention;

FIG. 8 provides another table illustrating the metering process, according to one embodiment of the present invention; and FIG. 9 provides another table illustrating the metering process, according to one embodiment of the present invention;

DETAILED DESCRIPTION OF PREFERRED EMBODIMENTS

Figure 1:
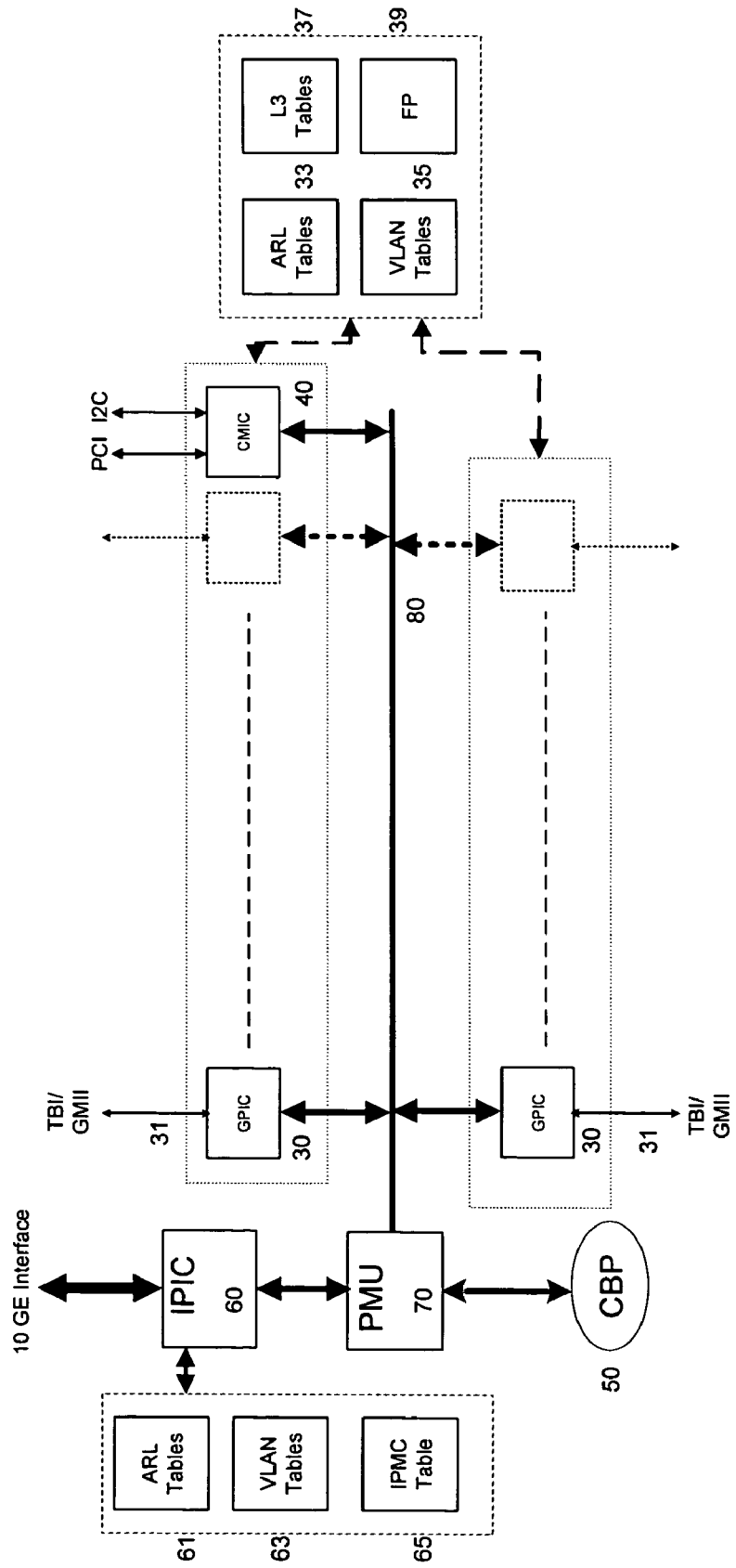
FIG. 1 illustrates a block diagram providing the basic elements of a network device, according to one embodiment of the present invention.

The present invention is directed, in one embodiment, to a network device that receives data and processes that data and that may forward that data onto a destination based on attributes of that data. A general schematic of the network device is illustrated in FIG. 1. The following are the major blocks in the network device, according to at least one embodiment: Gigabit Port Interface Controller (GPIC) 30; Interconnect Port Interface Controller (IPIC) 60; CPU Management Interface Controller (CMIC) 40; Common Buffer Pool (CBP)/Common Buffer Manager (CBM) 50; Pipelined Memory Management Unit (PMU) 70; and Cell Protocol Sideband (CPS) Channel 80. The above components are discussed below. In addition, a Central Processing Unit (CPU) can be used as necessary to program the network device with rules which are appropriate to control packet processing. However, once the network device is appropriately programmed or configured, it operates, as much as possible, in a free running manner without communicating with CPU.

The Gigabit Port Interface Controller (GPIC) module interfaces to the Gigabit port 31. On the medium side it interfaces to the TBI/GMII or MII from 10/100 and on the fabric side it interfaces to the CPS channel 80. In one example, each GPIC supports at least one 1 Gigabit port or a 10/100 Mbps port. Each GPIC performs both the ingress and egress functions. The number of GPICs provided on the network device depends on the precise configuration of the device. Similarly, additional interconnect links to additional external devices and/or CPUs may be provided as necessary.

The Interconnect Port Interface Controller (IPIC) 60 module, in one example, interfaces to CPS Channel 80 on one side and a high speed interface, called HIGIG interface, on the other side. The HIGIG is a XAUI interface, providing a total bandwidth of 10 Gbps, in a particular example, according to some embodiments. The CPU Management Interface Controller (CMIC) 40 block is the gateway to the host CPU. In it's simplest form, it provides sequential direct mapped accesses between the CPU and the network device. The bus interface can be a 66 MHz PCI. In addition, an I2C (2-wire serial) bus interface may be supported by the CMIC, to accommodate low-cost embedded designs where space and cost are a premium.

The Common Buffer Pool (CBP) 50 is the on-chip data memory, according to one embodiment. Frames are stored in the packet buffer before they are transmitted out. The actual size of the on-chip memory is determined after studying performance simulations and taking into cost considerations.

All packets in the CBP are stored as cells. The Common Buffer Manager (CBM) does all the queue management. It may be responsible for: assigning cell pointers to incoming cells; assigning PIDs (Packet ID) once the packet is fully written into the CBP; management of the on-chip Free Address Pointer pool (FAP); actual data transfers to/from data pool; and memory budget management.

When the packet comes in from the ingress port the decision to accept the frame for learning and forwarding is done based on several ingress rules. These ingress rules may be based on the Protocols and Filtering Mechanisms supported in the network device. These functions may be performed by modules contained in the network device. These modules include Address Resolution Logic (ARL) tables 33, Layer 3 (L3) tables 37, Virtual Local Area Network (VLAN) tables 35 and a Field Processor (FP) 39. These modules may be common to the port interfaces, such as CMIC and the GPICs, or may be specific to each port interface. The IPIC has its own ARL and VLAN table modules, 61 and 63, and an IP multicast (IPMC) table module 65 for handling multicast IP packets sent through the high speed interface. The present invention, according to certain embodiments, is directed to the Field Processor (FP) and is discussed below.

The present invention details a specification of a different proposal than that proposed in earlier network devices. The FP, in most embodiments, is centralized, like the ARL modules, for all ports. In this approach, ALL packets received by switched or non-switched ports can use a single instantiation of this mechanism for filtering. The FP contains a new kind of filter mechanism based primarily on fields instead of bytes from the packet. The FP is made up of N identical slices, which perform very similar functions to the filtering mechanisms of the prior art.

Figure 2:
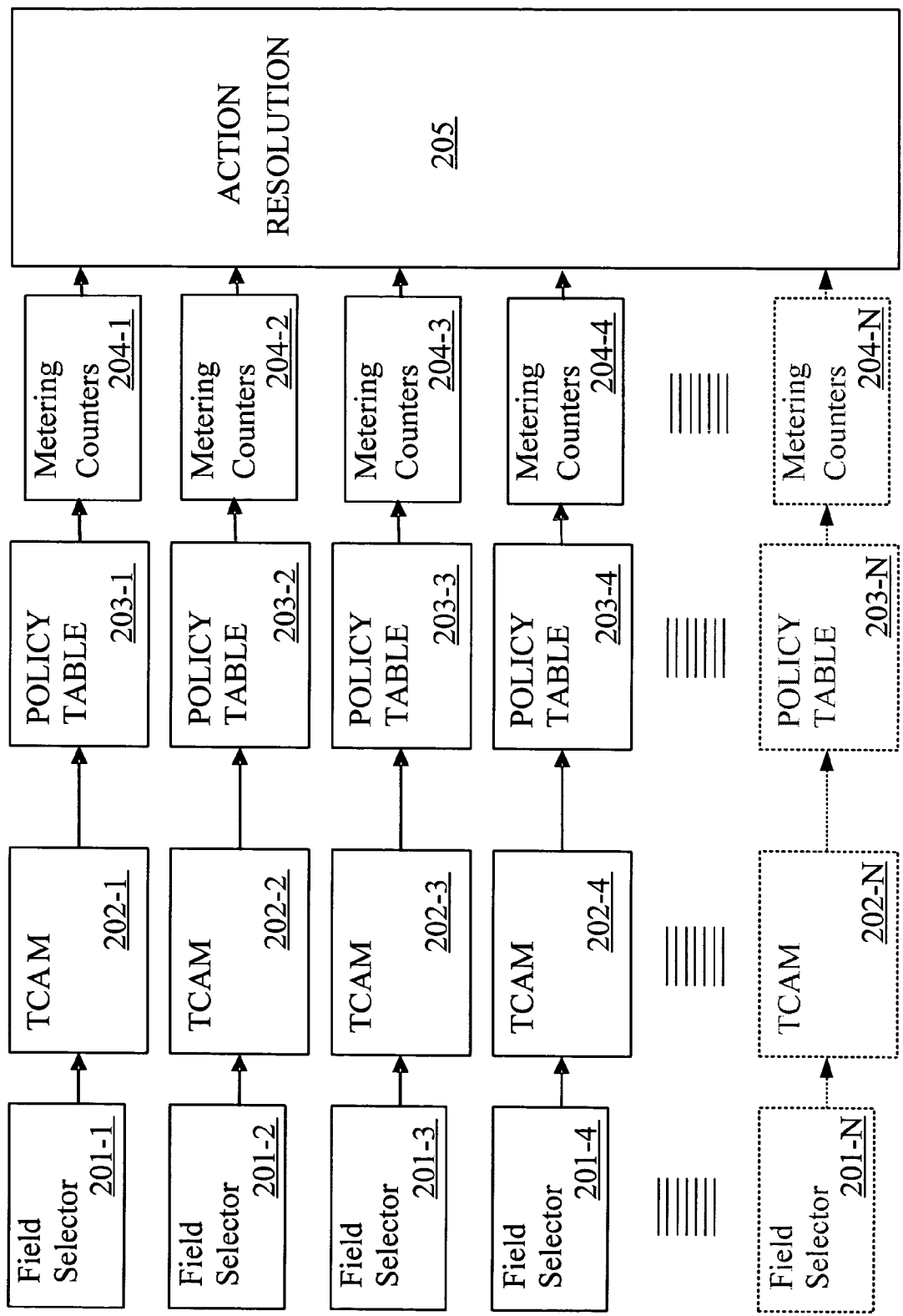
FIG. 2 provides a block diagram illustrating elements used to process packets by the network switch, according to one embodiment of the present invention.

An FP includes any number of slices. In one embodiment, there are 16 slices. In FIG. 2, "N" slices are illustrated, where each portion leading up to the action resolution module 205 is a slice. A slice has functions similar to what is in the prior art filtering processors. Each slice has a field selector, 201-1 to 201-N, that is discussed in greater detail below. It is capable of classifying packets and generating actions based on that classification. The classification of packets in a slice uses a Ternary Content Addressable Memory (CAM) (TCAM) 202-1 to 202-N. The actions associated with a match are contained in a Policy Table 203-1 to 203-N. Each slice also contains metering and counters 204-1 to 204-N, although they are not required. Since slices are based on TCAM technology, following is a brief description of the function of a TCAM.

A Binary Cam is a memory that contains a function to first compare a primary input bus (which is the width of the memory) with all of the entries in the memory. The result of the comparison outputs an address for which entry matched. If there is more than one match, the entry with the lowest physical address is the highest priority. A Ternary CAM has the same mechanism but in addition has a mask per entry. The mask selects which bits in the memory entry are required to match exactly with the bits from the primary input bus, in order to determine if there is a match.

The slice operates on a field selection approach. In this approach, specific fields are parsed from the packet and applied to the TCAM. The TCAM determines if there is a match and outputs the address of the matched location. The TCAM prioritizes multiple matches based on the address of the match. Software is required to prioritize the entries in the TCAM appropriately.

Each slice includes the following elements: three field selectors 201-N, where there may be three different groups of fields applied to the TCAM 202-N, one TCAM, with hardware to support insertion and deletion, one policy table 203-N, having one entry per TCAM entry, with each serving the action resolution block 205. The slice also may include one group of counters, with one counter per TCAM entry, and one group of meters, one meter per TCAM entry 204-N. The meters mechanism is similar to what is in the prior art, but with greater granularity, much enhanced feature set, and greater refresh capabilities than are found generally. There are sections on meters and counters discussed in greater detail below.

The number of slices and the number of entries per slice has no effect on the performance of the FP. The FP processes a packet every clock. In one embodiment, the FP has enough bandwidth with a 133 MHZ clock to support 24 GE and 4-10 GE (or 12 Gbps HIGIG) ports at the same time.

It should be noted that each slice is an independent searching mechanism that is capable of creating actions and updating meters and counters. If there are 16 slices, as in one embodiment, then there would be 16 separate filters running in parallel. It is therefore possible to generate 16 matches per packet, along with up to 16 meter updates and 16 counter updates.

Figure 3:
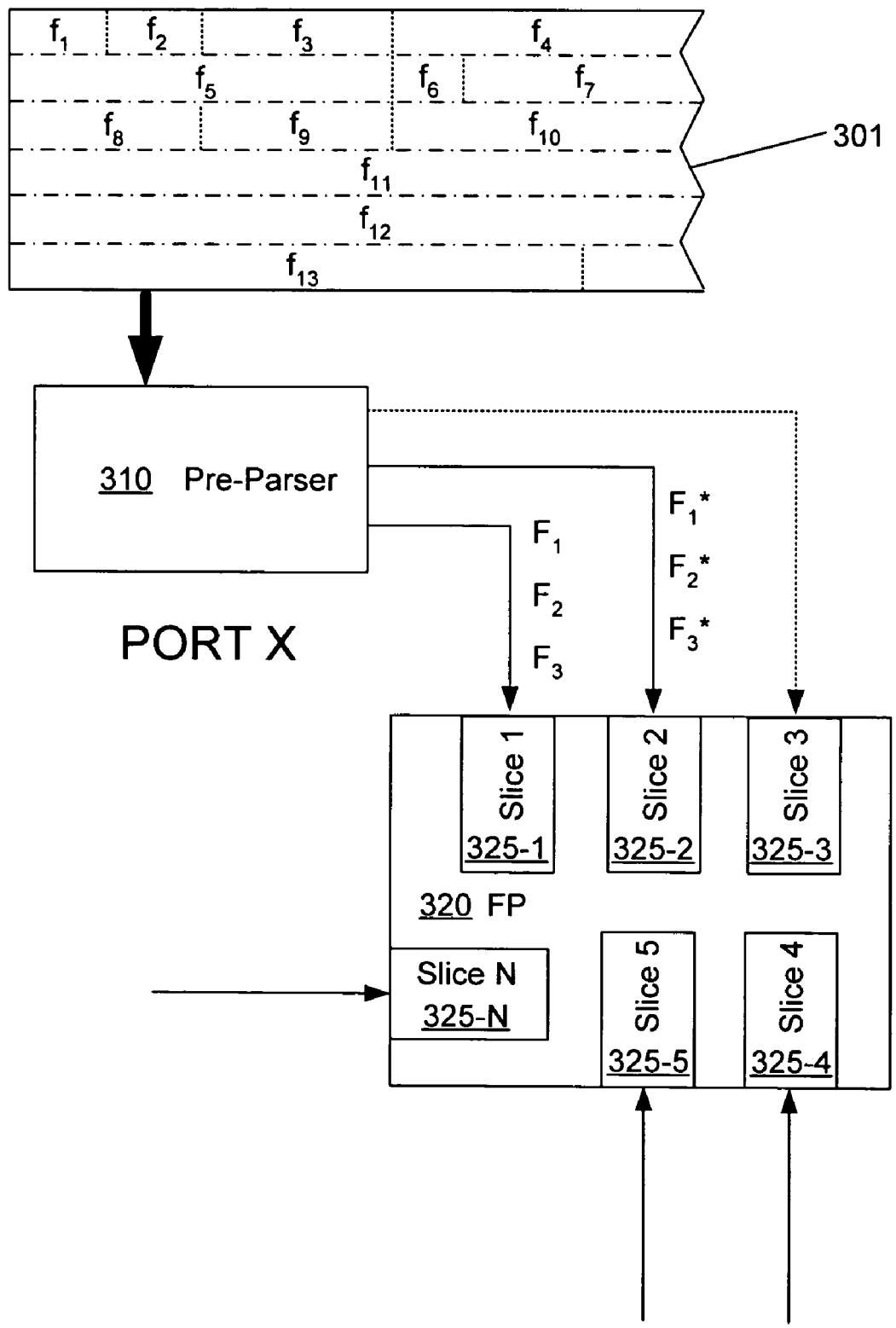
FIG. 3 illustrates a block diagram showing the filtering packets through the parsing of fields from a packet, according to one embodiment of the present invention.

This aspect is further illustrated in FIG. 3. A packet 301 is shown having multiple fields in the header of the packet. A pre-parser 310 parses the packet to obtain field values from the packet. It is noted that the parsing occurs on a per port basis and the number of filtering values obtainable is dependent on the number of slices 325-1 to 325-N contained in the FP 320. Thus, for the case when the FP contains 16 slices, then each port can filter the received packet based on 16 hits from the 16 slices. As illustrated, the Port X sends $F_1$, $F_2$ and $F_3$ as an N-tuple to the FP and can also send $F_1^*$, $F_2^*$ and $F_3^*$ as fields as well.

As previously mentioned, a CAM will prioritize multiple matches based on the lowest physical address with a match taking highest priority. When controlling software wishes to insert a rule into a CAM, the software must decide the priority of that rule over all of the other rules with the same fields. This is especially important if the filtering process wishes to filter on subnets in an LPM type manner, or when one rule might match on specific bits in a field while another matches on different bits in the same field.

In order to aid the insertion or deletion of a rule within a group of rules that have the same characteristics, the FP provides hardware that allows the software to indicate where the rule should be inserted (or deleted), and how many rules above that entry need to be shuffled. This saves the software the burden of needing to shuffle the table by itself.

Figure 4:
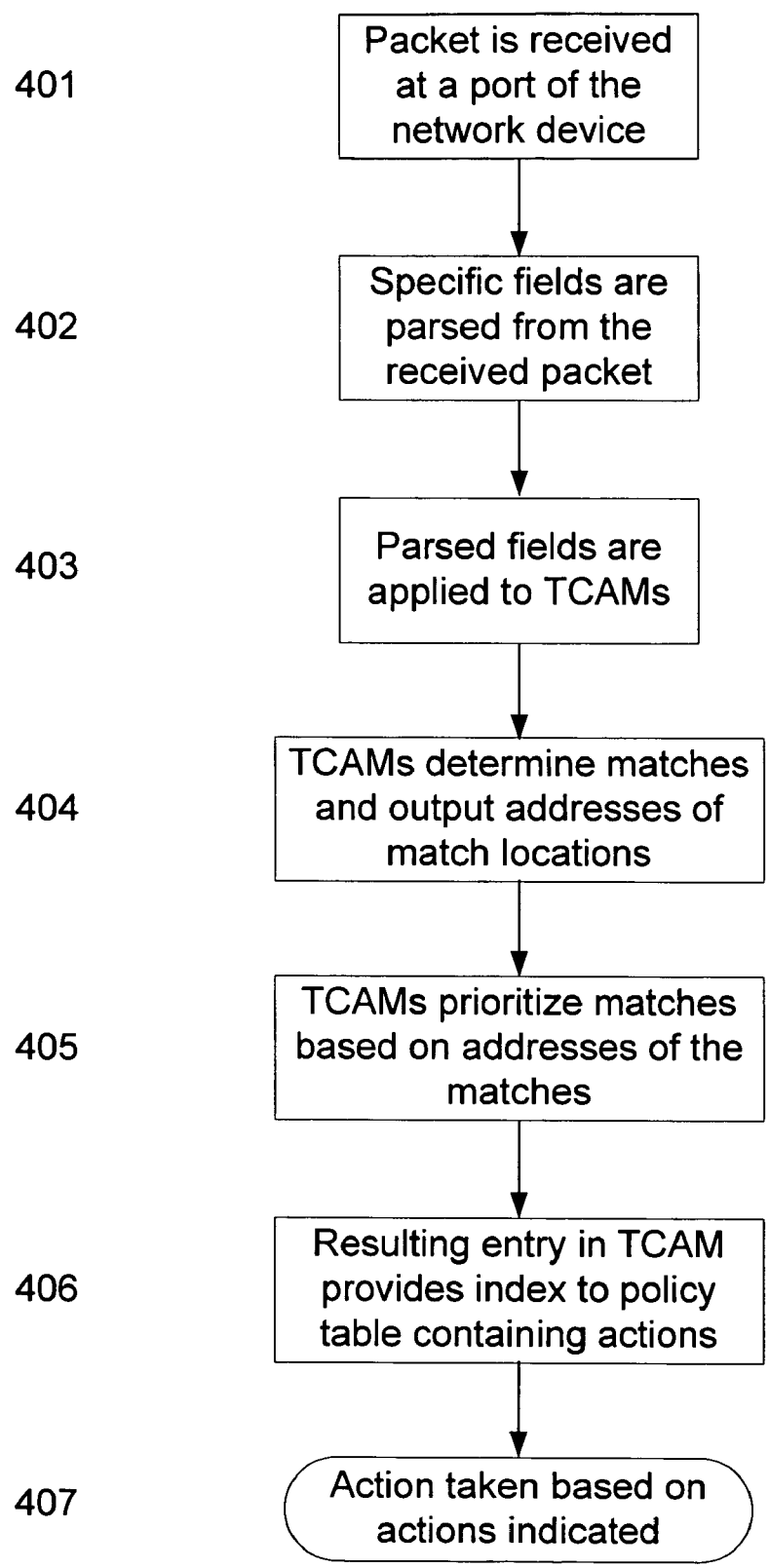
FIG. 4 illustrates a flow chart showing the process of handling packets by the network device, according to one embodiment of the present invention.

The general process of filtering of data through the FP is illustrated in FIG. 4. In step 401, a packet is received at a port of the network device and specific fields are parsed from the received packet, in step 402. The parsed fields are applied to the TCAMs of the slices, in step 403, and the TCAMs determine matches and output addresses of match locations, in step 404. The TCAMs prioritize matches based on addresses of the matches, in step 405, and the resulting entry in the TCAM provides an index into the policy table containing actions, in step 407. Lastly, actions are taken on the indicated actions, in 407.

Some of the fields of interest that may need to be parsed from the packet are listed below. There are standard Ethernet fields as well as user defined fields. The two user defined fields are each 128 bits in width. Each of these fields can be composed of any four groups of four contiguous bytes from the first 128 bytes of the packet. The bytes selected generally start at a four byte boundary. The selected fields include:

Destination MAC Address (48 bits), Source MAC Address (48 bits), EtherType (16 bits), Outer VLAN Tag (VLAN ID and Priority) (16 bits), Inner VLAN Tag (VLAN ID and Priority) (16 bits), Destination IPv4 Address (32 bits), Source IPv4 Address (32 bits), Destination IPv6 Address (64 bits), Source IpPv6 Address (64 bits), IP Protocol (8 bits), IP Flags (2 bits), TCP Flags (6 bits), IPv6 Fields, Destination TCP/UDP Port (16 bits), Source TCP/UDP Port (16 bits), DSCP/TOS (6 bits), UDF1—User Defined Field #1 (128 bits) and UDF2—User Defined Field #2 (128 bits).

Another aspect of the present invention is its ability to parse Layer 4 protocols and utilize those parsed results. The IP Header in the packet may carry options that make the IP Header of variable length. The parser is responsible for parsing the L4 headers even when IP Options are present. Other fields that can be applied to the FP but that do not come directly from the packet are: Source Port/TGID (5 bits), Source Module ID (7 bits), Destination Port/TGID (5 bits), Destination Moulde ID (7 bits), Lookup status (16 bits), L2 Source Hit (1 bit), L2 Destination Hit (1 bit), L3 Unicast Source Hit (1 bit), L3 Unicast Destination Hit (1 bit), LPM Hit (1 bit), L3_TUNNEL Hit (1 bit), IPMC *,G Hit (1 bit), IPMC S,G Hit (1 bit), L2 Multicast Hit (1 bit), Vlan Valid (1 bit), VXLT_Hit (Vlan translate Hit) (1 bit), L2_Static (1 bit), BPDU (1 bit), Ingress Spanning Tree State (2 bits), Pause Frame (1 bit), Packet Format (9 bits) and Module Header Opcode (3 bits).

The FP has the ability to perform range checking on Source and Destination UDP port numbers. There are 16 range checkers in the FP. In certain embodiments, each range checker includes the following fields: LOWER_BOUNDS (16 bits), UPPER_BOUNDS (16 bits), ENABLE (1 bit) and SOURCE_DESTINATION_SELECT (1 bit).

The ENABLE bit indicates if the range checker is on. The SOURCE_DESTINATION_SELECT determines if the range checker is checking a Source UDP port number or a destination UDP port number. The LOWER_BOUNDS and UPPER_BOUNDS define the range within which the value of the port number selected must fall. For instance, if the LOWER_BOUNDS is programmed to a one, and the UPPER_BOUNDS is programmed to a 10, then there will be a hit in the range checker if the selected port number has a value of between one and 10 inclusive (any number in the range starting at one and ending at 10).

It should be noted that more range checking can be accomplished via the TCAM. Since each rule has it's own mask, it is possible to create multiple entries to define a range. For instance, if one wanted to check whether a port was within the range of 0x24 to 0x80, the following masks and rules would be required:
RULE=8'b00100100, MASK=8'b111111000=>Covers 0x24 to 0x27
RULE=8'b0001010000, MASK=8'b11111000=>Covers 0x28 to 0x2f
RULE=8'b00110000, MASK=8'b11110000=>Covers 0x30 to 0x3f
RULE=8'b01000000, MASK=8'b11000000=>Covers 0x40 to 0x7f
RULE=8'b1000000, MASK=8'b11111111=>Covers 0x80.

Given that the number of combinations of the above Packet Fields is large, it is necessary, in order to simplify design and to support a larger number of flows, that the total number of fields that need to be compared at one time be limited. Additionally, there are status bits and other types of information that do not come from the packet but are a result of lookups or other functions within the device, that would be valuable as inputs to the FP slice. Therefore, the fields applied to each slice may divided into three distinct sections of different widths. These are, according to one embodiment, FPF1, FPF2, and FPF3, where FPF1 (FP Field 1), is 32 bits wide, FPF2 is 128 bits wide and FPF3 is 16 bits wide. One embodiment is as follows:

FPF1 FIELD
    IPBM
    Src_Modid,Src_Port_TGID,Dst_Modid,Dst_Port_TGID,
      TCP/UDP Src Port, TCP/UDP Dst Port
    OVid,,Ivid
    EtherType,IP_Protocol.
FPF2 FIELD
    SIP,DIP,IP_Protocol,L4_Src,L4_Dst,DSCP,IPFlag,
    TCP_Control,TTL
    SIP,DIP,IP_Protocol,Range_Chk_Results,L4_Dst,DSCP,IPFlag,
    TCP_Control,TTL
    SIP,DIP,IP_Protocol,L4_Src,Range_Chk_Results,DSCP,IPFlag,
    TCP_Control,TTL
    IPv6 SIP
    IPv6 DIP
    IPv6_DIP_Upper64,NH,TC,FL,TTL,TCP_Control
    DA, SA,EtherType,Ovid
    SA, SIP,EtherType,Ovid
    DA, DIP,EtherType,Ovid
    UDF1
    UDF2.
FPF3 FIELD
    Packet Format,MHOpcode
    Src_Modid,Src_Port_TGID,
    Dst_Modid,Dst_Port_TGID,
    Lookup Status.

Note that if the user selects FPF1.1PBM, then an extra mask is applied to the TCAM. This mechanism allows for multiple ports to share a rule within a TCAM entry. In this case, the user can program a TCAM entry FPF 1 field for which ports are allowed to match on that rule, and the hardware will ensure that only those ports indeed do match on that rule by logically ANDing this new global mask with the associated masks bits of the entry (the ANDing is done for every entry in the TCAM).

The UDF selection logic includes some parsing logic, a starting offset table, and two sets of byte selection logic. Each UDF selects 16 bytes from the packet. The 16 bytes are divided into four chunks of four bytes each. Each of the chunks can be selected from any of the 32—four byte chunks within the 128 bytes. In other words, each chunk of four bytes can be selected by starting at any four byte offset.

The mechanism works as follows. The Parser will generate a 7 bit index to the starting offset table. The 7 bits includes:
2 bits for L2 Format:
    (00) EII
    (01) 802.3 SNAP
    (10) 802.3LLC (not SNAP)
    (11) NONE OF THE ABOVE
2 bits for how the packet is tagged
    (00) No tags
    (01) One tag
    (10) Two tags
    (11) N/A
3 bits for IP header types
    (000) One IPv4 No Options header only
    (001) One IPv4 With Options header only
    (010) One IPv6 No Options header only
    (011) Outer IPv4 header No Options AND Inner IPv4 header No Options
    (100) Outer IPv4 header No Options AND Inner IPv4 header With Options (101) Outer IPv4 header No Options AND Inner IPv6 header No Options
(110) Outer IPv4 header With Options AND Inner IPv6 header No Options
(111) NONE OF THE ABOVE Each table entry may include of four—five bit index fields, as well as four—two bit control field, per UDF. Since the table supports the selections for two UDFs, there are eight—five bit index fields and eight—two bit control fields.

Each index field selects the starting offset within the packet for one of the four byte regions. The four—four byte regions are concatenated to form the UDF. For example, if UDF1.INDEX0 is programmed with a value of one, then the four byte region starting at byte four (the first byte is considered byte 0) would become the first four bytes of UDF1. If UDF1.INDEX1 is programmed with a value of eight, then the four byte region starting at byte 32 would become the second four bytes of UDF 1.

The two control bits are used to modify the INDEX values if there are options in an Ipv4 header. The first bit indicates whether to add the outer IPv4 header length to the starting offset. The second bit whether to add the inner IPv4 header length to the offset. These bits might be mutually exclusive.

The four byte regions or chunks are selected as follows:

| Chunk 0 | Chunk 1 | Chunk 2 | Chunk 3 ... | Chunk 29 | Chunk 30 | Chunk 31 |
|---------|---------|---------|-------------|----------|----------|----------|
| B0-B3   | B4-B7   | B8-B11  | B12-B15     | B116-B119 | B120-B123 | B124-B127 |

In some embodiments of the present invention, each port has it's own selectors for FPF1, FPF2, and FPF3, on a per slice basis. This should provide the greatest amount of freedom and efficiency for selection and usage of rules and slices.

Following is the SLICE Policy Table definition, according to one embodiment. The Policy Table contains all of the actions associated with an entry in the T-CAM. There are four different types of actions: These are: PID_: Indicates profile independent action bits; RP_: Indicates Red Profile action bits; YP_: Indicates Yellow Profile action bits. All other action bits are Green-Profile bits.

The Policy Table has been designed to remove the possibility of conflicting actions within the same entry. However, for the egress port bit map this was not possible. The priority for actions that modify the port bit map within a Policy Table Entry is:
DROP
Else REPLACE
Else REDIRECT
THEN EGRESSMASK
THEN COPYTOCPU The priority for actions that modify the port bit map between rules is:
DROP
Else REPLACE IF HIGHER TCAM #
ELSE REDIRECT
THEN EGRESSMASK
THEN COPYTOCPU A format of the slice policy table, according to one embodiment, is illustrated in TABLES 1-4:

TABLE 1

| Field Name | Width | Definition |
|------------|-------|------------|
| CHANGE_PKT_PRIORITY | 4 | 0000 - NOOP |
| | | 0001 - NEWPRIORITY (Packet and Internal Priority) |
| | | 0010 - FROMTOS_FIELD (Packet and Internal Priority) |
| | | 0011 - NOOP |
| | | 0100 - COPYFROM_INNERPRI (Packet and Internal Priority) |
| | | 0101 - DONOTCHANGE (Packet and Internal Priority) |
| | | 0110 - NOOP |
| | | 0111 - NOOP |
| | | 1000 - NOOP |
| | | 1001 - NEWPRIORITY (Internal Priority) |
| | | 1010 - FROMTOS_FIELD (Internal Priority) |
| | | 1011 - NOOP |
| | | 1100 - COPYFROM_INNERPRI (Internal Priority) |
| | | 1101 - DONOTCHANGE (Internal Priority) |
| | | 1110 - NOOP |
| | | 1111 - NOOP |
| CHANGE_DSCP_TOS | 3 | 000 - NOOP |
| | | 001 - NEWTOS |
| | | 010 - TOSFROMPKTPRIORITY |
| | | 011 - NEWDSCP |
| | | 100 - DONOTCHANGE |
| | | 101 - NOOP |
| | | 111 - NOOP |
| | | Note: Applies to both IPv4 and IPv6 packets. To apply selectively, use ipv4 or ipv6 in packet format |

TABLE 2

| Field Name | Width | Definition |
|---|---|---|
| COPYTO_CPU | 2 | 00 - NOOP<br>01 - COPY<br>10 - DONOTCOPY<br>/* OVERRIDES SWITCH LOGIC*/<br>11 - NOOP |
| PACKET_REDIRECTION | 2 | 00 - NOOP<br>01 - REDIRECT<br>10 - DONOTREDIRECT<br>11 - NOOP<br>Note: The packet format will have all, unicast, broadcast, multicast, unknown multicast or unknown unicast |
| USE_LONGFIELD PACKET_HANDLING | 2 | 00 - NOOP<br>01 - REPLACE_PORTBITMAP<br>10 - APPLY_EGRESS_MASK<br>11 - APPLY_CLASS_TAG |
| DROP | 2 | 00 - NOOP<br>01 - DROP<br>10 - DONOTDROP<br>11 - NOOP |
| MIRROR | 2 | 00 - NOOP<br>01 - INGRESS MIRROR<br>10 - EGRESS MIRROR |
| UPDATE_COUNTER | 1 | 0 - NOOP<br>1 - UPDATE COUNTER |
| L3SW_MACDA_VLAN_REWRITE | 3 | 000 - NOOP<br>001 - CHANGE_VLAN<br>010 - DONOT_CHANGE_VLAN<br>011 - NOOP<br>100 - CHANGE_MACDA<br>101 - DONOT_CHANGE_MACDA<br>110 - L3_SWITCH<br>111 - DONOT_L3SWITCH |

TABLE 3

| Field Name | Width | Definition |
|---|---|---|
| DROP_PRECEDENCE | 2 | 00 - NOOP<br>01 - GREEN<br>10 - YELLOW<br>11 - RED |
| RP_DROP | 2 | 00 - NOOP<br>01 - DROP<br>10 - DONOTDROP<br>11 - NOOP |
| RP_DROP_PRECEDENCE | 2 | 00 - NOOP<br>01 - GREEN<br>10 - YELLOW<br>11 - RED |
| RP_COPYTOCPU | 2 | 00 - NOOP<br>01 - COPY<br>10 - DONOTCOPY<br>11 - NOOP |
| RP_CHANGE_DSCP | 1 | 0 - NOOP<br>1 - RPNEWDSCP<br>/* Note: Applies to both IPv4 and IPv6 packets. To apply selectively, use ipv4 or ipv6 in packet format*/ |
| YP_DROP | 2 | 00 - NOOP<br>01 - DROP<br>10 - DONOTDROP<br>11 - NOOP |
| YP_DROP_PRECEDENCE | 2 | 00 - NOOP<br>01 - GREEN<br>10 - YELLOW<br>11 - RED |
| YP_COPYTOCPU | 2 | 00 - NOOP<br>01 - COPY<br>10 - DONOTCOPY<br>11 - NOOP |
| YP_CHANGE_DSCP | 2 | 0 - NOOP<br>1 - RPNEWDSCP<br>/* Note: Applies to both IPv4 and IPv6 packets. To apply selectively, use ipv4 or ipv6 in packet format*/ |

TABLE 4

| | | |
|---|---|---|
| COUNTER | 7 | Supports 128 Counters/slice |
| COUNTER_MODE | 3 | Counter Mode Control |
| METER_GROUP_NUMBER | 5 | SELECTS THE METER GROUP |
| METER_SELECTOR_BITAMP | 4 | Supports 4 Meters/Meter Group |
| METER_PAIR_MODE | 4 | Supports 2 Meter Pairs/Meter Group |
| NEWPRI | 3 | NEWPRI |
| NEWDSCP/TOS | 6 | NEWTOS/NEWDSCP |
| RP_DSCP/TOS | 6 | RP_NEWDSCP |
| YP_DSCP/TOS | 6 | YP_NEWDSCP |
| DEST_PORT | 5 | FOR REDIRECTION |
| DEST_MOD | 7 | FOR REDIRECTION |
| VLAN_VALUE/ NEXT_HOP_INDEX | 17 | Contains VLAN_ID for CHANGE_VLAN action. Contains NEXT_HOP_INDEX, ECMP Count (4), and ECMP bit for CHANGE_MAC_DA action and for L3_SWITCH Action |
| USE_LONG_FIELD | 29 | CLASS_TAG, PBM, EGRESS_MASK |
| MTP_INDEX | 5 | MTP port index for Ingress, Mirroring as well as for Egress Mirroring. |
| Total | 116 | |

The metering logic supports the concept of meter groups. This works by providing in the Policy Table an index into a meter group table, along with a meter selector bitmap. Each entry in this table can have 4 meters/buckets, that are each selected by the bitmap from the Policy Table. There are some programming restrictions (tbd). The function of the meters within a group is defined by the meter pair mode bits (MPM). The default mode is that a full match is only considered in-profile if all of the meters selected are in-profile at that point in time. However, srTCM and trTCM operate differently.

TrTCM and srTCM each require three different states to be defined which are Green, Yellow, and Red, with different actions to be taken in each case. The meter group is further divided into 2 meter group pairs. For each meter group pair, there are three bits (meter pair mode or MPM) that define the operational mode of that sub-group. The modes are:

MPM[1:0]=3'b000: FLOW; This is the "normal" mode whereby all selected buckets must be in profile for the packet to be considered in profile;

MPM[1:0]=2'b010: trTCM COLOR BLIND; This mode determines the state (color) of the in coming packet only based on the profile status of each bucket;

MPM[1:0]=2'b011: trTCM COLOR AWARE; This mode determines the state (color) of the in coming packet based on the profile status of each bucket, and the incoming state (color) of the packet. The incoming state is based on the DSCP value of the packet;

MPM[1:0]=2'b110: stTCM COLOR BLIND; This mode determines the state (color) of the in coming packet only based on the profile status of each bucket;

MPM[1:0]=2'b111: stTCM COLOR AWARE; This mode determines the state (color) of the in coming packet based on the profile status of each bucket, and the incoming state (color) of the packet. The incoming state is based on the DSCP value of the packet.

Tables illustrated in FIGS. 5-9 describing how the metering works, and all of these cases assume the associated bucket is selected by the meter selector bitmap. Note, the COLOR AWARE MODE requires a new table (DSCP_TO_COLOR) that is indexed by the incoming DSCP value (and the source port), and has two bits per entry to indicate the COLOR_STATE that value represents.

Meters are refreshed, according to one embodiment, based on a 7.8125 us tick. This provides for a 64000 bps granularity. The refreshing of slices will be synchronized so that meter group N is each slice will be refreshed at the same time (on the same clock). Specific hardware guarantees this refreshing mechanism by stalling refresh updates for packet updates. In the worst case scenario of packet updates six out of every seven clocks, it will take 7clocks * 128 meters/4 meters/group * 7.5 ns/clock=224 clocks or 1.68 us to update all of the meters.

The FP provides action bits for Green, Yellow, and Red states, as well as profile (color) independent actions. Additionally, the FP will provide 2 CNG bits which indicate the state of the buckets for that match. If there are multiple matches due to the slice architecture, then the slice with the highest priority would control the 2CNGbits. The meter data structure, according to one embodiment is illustrated in TABLE 5.

TABLE 5

| Field | Size | Description |
|---|---|---|
| REFRESH_MODE | 1 | Used to determine if a meter should perform srtcm refreshing wherein refreshing is dependent on the profile status. |
| BUCKETCOUNT | 32 | The BUCKETCOUNT is a 2'scomplement number that Increments with 1/16 of a bit granularity. The most significant bit indicates if the Bucket is in profile (0) or out of profile (1). |
| REFRESHCOUNT | 19 | The number of tokens that are added to the bucket each refresh interval. With a refresh interval of 7.8125us, a value of one in the REFRESHCOUNT Represents 64 kbits/sec. |

TABLE 5-continued

| Field | Size | Description |
|---|---|---|
| BUCKETSIZE | 4 | The BUCKETSIZE contains an encoded value that represents a saturation level for the BUCKETCOUNT. The BUCKETCOUNT is prevented by the metering logic from exceeding the BUCKETSIZE. The values and encodings are:<br>4'd0:BUCKET_SIZE=//4K−1<br>4'd1:BUCKET_SIZE=//8K−1<br>4'd2:BUCKET_SIZE=//16K−1<br>4'd3:BUCKET_SIZE=//64K−1<br>4'd4:BUCKET_SIZE=//128K−1<br>4'd5:BUCKET_SIZE=//256K−1<br>4'd6:BUCKET_SIZE=//512K−1<br>4'd7:BUCKET_SIZE=//1M−1<br>4'd8:BUCKET_SIZE=//2M−1<br>4'd9:BUCKET_SIZE=//4M−1<br>4'd10:BUCKET_SIZE=//8M−1<br>4'd11:BUCKET_SIZE=//16M−1 |
| TOTAL | 56 | |

The FP provides for General Purpose Counters (GPCs) in each slice. In the Policy Table, there are two fields which control the updates of counters. Each CAM full match will be capable of updating one counter. These policy table fields indicate which counter to update and how to update that counter. The COUNTER indicates which GPC to update. The COUNTER_MODE field is encoded as follows in TABLE 6:

TABLE 6

| 3'b000 | Add Packet Byte Count if Green |
|---|---|
| 3'b001 | Add Packet Byte Count if Yellow |
| 3'b010 | Add Packet Byte Count if Red |
| 3'b011 | Add Packet Byte Count independent of Profile |
| 3'b100 | Increment if Green |
| 3'b101 | Increment if Yellow |
| 3'b110 | Increment if Red |
| 3'b111 | Increment independent of Profile |

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
receiving a datagram having multiple field values at a port of a network device;
parsing the received datagram to obtain the field values;
applying the parsed field values to a field processor, the field processor comprising multiple slices configured to operate in parallel, wherein each slice functions as a separate and independent search mechanism of the field processor and each slice comprises at least one Ternary Content Addressable Memory (TCAM) and at least one policy table;
determining matches in the TCAM using the parsed field values;
indexing into a policy table based on the determined matches to obtain an action entry; and
taking an action based on the obtained action entry.

2. A method as recited in claim 1, wherein the taking of the action based on the obtained action entry comprises at least one of dropping the datagram, replacing field values in the datagram, redirecting the datagram and copying the datagram to a central processing unit.

3. A method as recited in claim 1, wherein the determining of matches comprises prioritizing the matches based on addresses of the matches in the TCAM to obtain a prioritized match.

4. A method as recited in claim 3, wherein the indexing into the policy table comprises indexing into the policy table using the prioritized match as an index.

5. A method as recited in claim 1, wherein the parsing of the received datagram to obtain the field values comprises parsing the received datagram to obtain user defined field values.

6. A method as recited in claim 1, wherein the applying of the parsed field values comprises applying multiple sets of parsed field values to one of the slices comprising multiple TCAMs to obtain multiple matches.

7. A method as recited in claim 6, further comprising:
obtaining multiple action values based on the multiple matches and resolving a single action based on the multiple action values.

8. A method as recited in claim 1, further comprising:
metering a flow of datagrams through the network device using metering logic.

9. A method as recited in claim 1, further comprising:
counting a number of datagrams passing through the network device using metering logic.

10. A method as recited in claim 1, wherein the applying, determining and indexing are performed by a field processor module of the network device.

11. An apparatus, comprising:
   receiving means for receiving a datagram having multiple field values at a port of a network device;
   parsing means for parsing the received datagram to obtain the field values;
   applying means for applying the parsed field values to a field processor, the field processor comprising multiple slices configured to operate in parallel, wherein each slice functions as a separate and independent search mechanism of the field processor and each slice comprises at least one Ternary Content Addressable Memory (TCAM) and at least one policy table;
   determining means for determining matches in the TCAM using the parsed field values;
   indexing means for indexing into a policy table based on the determined matches to obtain an action entry; and
   action means for taking an action based on the obtained action entry.

12. An apparatus as recited in claim 11, wherein the action means comprises at least one of dropping means for dropping the datagram, field replacing means for replacing field values in the datagram, redirecting means for redirecting the datagram and copying means for copying the datagram to a central processing unit.

13. An apparatus as recited in claim 11, wherein the determining means comprises prioritizing means for prioritizing the matches based on addresses of the matches in the TCAM to obtain a prioritized match.

14. An apparatus as recited in claim 13, wherein the indexing means indexes into the policy table using the prioritized match as an index.

15. An apparatus as recited in claim 11, wherein the parsing means parses the received datagram to obtain user defined field values.

16. An apparatus as recited in claim 11, wherein the applying means applies multiple sets of parsed field values to one of the slices comprising multiple TCAMs to obtain multiple matches.

17. An apparatus as recited in claim 16, further comprising:
   obtaining means for obtaining multiple action values based on the multiple matches and resolving a single action based on the multiple action values.

18. An apparatus as recited in claim 11, further comprising:
   metering means for metering a flow of datagrams through the network device using metering logic.

19. An apparatus as recited in claim 11, further comprising:
   counting means for counting a number of datagrams passing through the network device using metering logic.

20. An apparatus as recited in claim 11, wherein the applying means, the determining means and the indexing means comprise a field processor module of the network device.

21. An apparatus, comprising:
   at least one port interface having at least one port configured to send and receive datagrams, wherein each datagram has multiple field values;
   a pre-parser configured to parse the received datagrams to obtain the field values; and
   a field processor comprising:
      multiple slices configured to operate in parallel, wherein each slice functions as a separate and independent search mechanism of the field processor and each slice comprises:
         at least one Ternary Content Addressable Memory (TCAM), the at least one TCAM configured to receive and process obtained field values and configured to provide an index value based on the parsed field values, and
         at least one policy table having a plurality of action entries, the at least one policy table configured to provide one of the action entries based on the index value received from the at least one TCAM, and
      an action resolution module configured to define an action based on the one of the action entries received from the at least one policy table.

22. An apparatus as recited in claim 21, wherein the action resolution unit is configured to define as the action at least one of dropping the datagram, replacing field values in the datagram, redirecting the datagram and copying the datagram to a central processing unit.

23. An apparatus as recited in claim 21, wherein the at least one TCAM is configured to obtain a prioritized match from the matches.

24. An apparatus as recited in claim 23, wherein the at least one policy table uses the prioritized match as an index.

25. An apparatus as recited in claim 21, wherein the pre-parser is configured to parse the received datagrams to obtain user defined field values.

26. An apparatus as recited in claim 21, wherein at least one of the slices comprises multiple TCAMs and the multiple TCAMs are configured to receive multiple sets of parsed field values to provide multiple matches.

27. An apparatus as recited in claim 26, wherein the at least one policy table comprises multiple policy tables, with each of the multiple TCAMs outputting to a respective one of the multiple policy tables and multiple action values are obtained.

28. An apparatus as recited in claim 21, further comprising:
   a metering module for metering a flow of datagrams through the network device using metering logic.

29. An apparatus as recited in claim 21, further comprising:
   a counting module for counting a number of datagrams passing through the network device using metering logic.

30. An apparatus as recited in claim 21, wherein the field processor module comprises sixteen TCAMs and sixteen policy tables that are configured to supply up to sixteen action entries to the action resolution module.

* * * * *